(12) United States Patent
Kito et al.

(10) Patent No.: US 6,188,140 B1
(45) Date of Patent: *Feb. 13, 2001

(54) IMMOBILIZER SYSTEM-MOUNTING VEHICLE AND MEMBER USED FOR THE IMMOBILIZER SYSTEM

(75) Inventors: Shozo Kito; Yoshinobu Ohyabu; Yoshihiro Katahira; Yoshiyuki Shindo; Toshiharu Katagiri; Masahiro Takita; Koji Okada, all of Aichi-ken (JP)

(73) Assignee: Kabushiki Kaisha Tokai-Rika-Denki-Seisakusho (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/125,575
(22) PCT Filed: Sep. 12, 1997
(86) PCT No.: PCT/JP97/03223
§ 371 Date: Aug. 20, 1998
§ 102(e) Date: Aug. 20, 1998
(87) PCT Pub. No.: WO98/10964
PCT Pub. Date: Mar. 19, 1998

(30) Foreign Application Priority Data

Sep. 13, 1996 (JP) .................................................. 8-243605
Jan. 29, 1997 (JP) .................................................. 9-015665

(51) Int. Cl.[7] ................................................ B60R 25/04
(52) U.S. Cl. ..................... 307/10.4; 307/10.2; 180/287; 340/825.72
(58) Field of Search ................... 307/10.4, 10.2, 307/10.5; 70/456 R; 180/287; 340/825.31, 825.72, 825.69

(56) References Cited

U.S. PATENT DOCUMENTS

| | | | |
|---|---|---|---|
| 4,901,547 | * | 2/1990 | Dal Palu' ........................ 70/456 R |
| 5,734,330 | * | 3/1998 | Nakamura ....................... 340/825.72 |
| 5,841,363 | * | 11/1998 | Jakob et al. .................... 340/825.69 |
| 5,869,908 | * | 2/1999 | Moczygemba et al. ............ 307/10.5 |
| 5,889,472 | * | 3/1999 | Nagel et al. .................... 340/825.72 |

FOREIGN PATENT DOCUMENTS

| | | |
|---|---|---|
| 62-221952 | 9/1987 | (JP) . |
| 3-4868 | 1/1991 | (JP) . |
| 3-125652 | 12/1991 | (JP) . |
| 6-255450 | 9/1994 | (JP) . |

* cited by examiner

*Primary Examiner*—Albert W. Paladini
(74) *Attorney, Agent, or Firm*—Akerman Senterfitt

(57) ABSTRACT

An operation member containing a transmitter for an immobilizer or receiver for the immobilizer, is indicated to a user so that the user may carefully handle the operation menber. An ignition key (1) has a grip (3) and a key plate (2) protruding from the grip (3). "Immobi" is engraved on the surface of the grip (3) to thereby form a first indication portion (11). "Immobi" is an abbreviation for an English word "immobilize". Inside the grip (3) is contained a transponder which is an immobilizer transmitter.

19 Claims, 4 Drawing Sheets

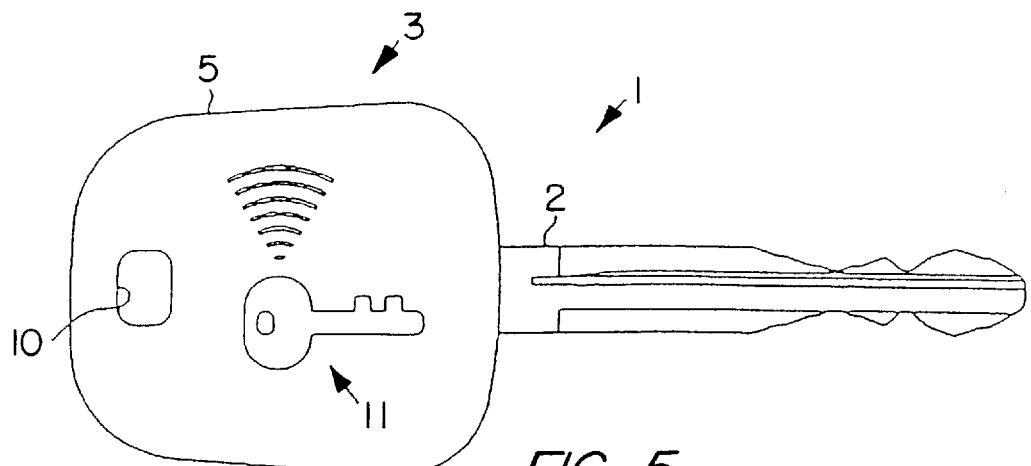
FIG. 5
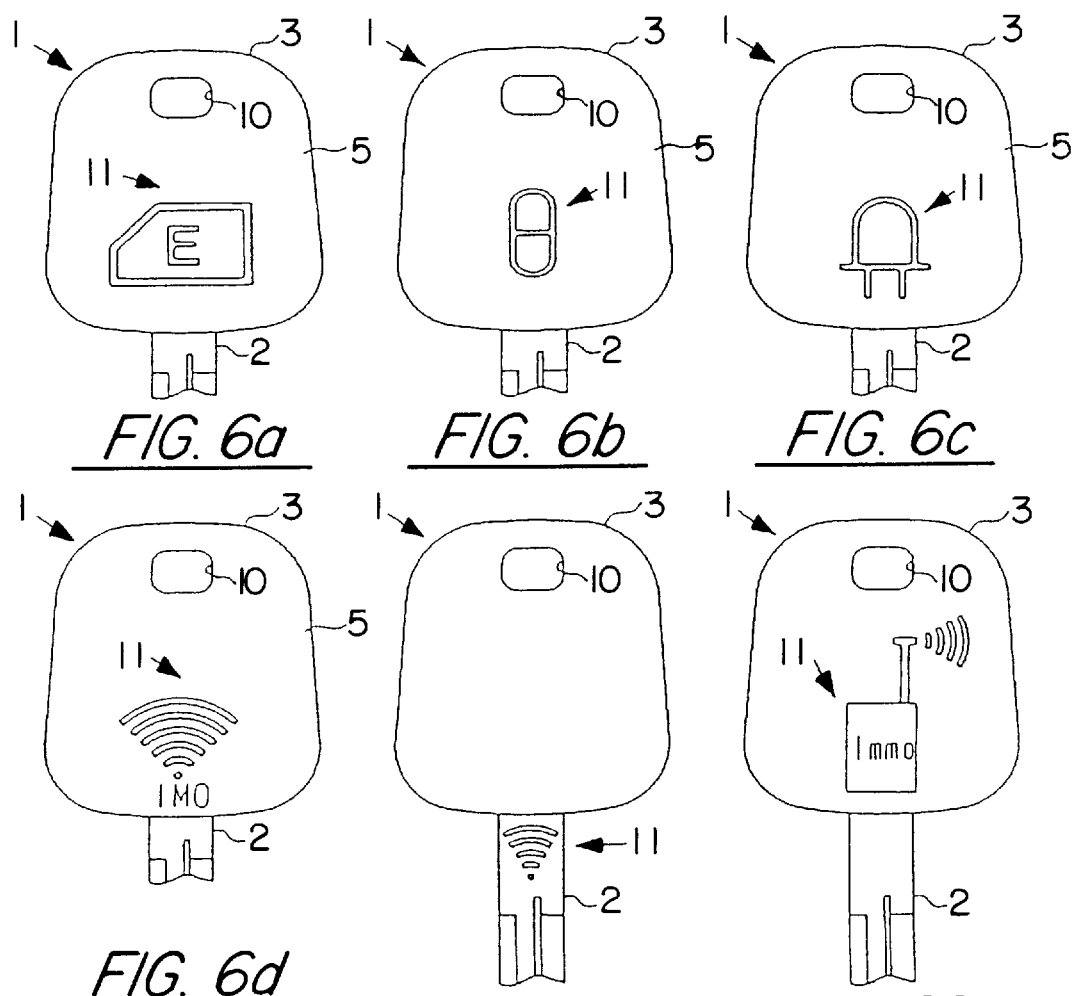
FIG. 6a  FIG. 6b  FIG. 6c
FIG. 6d  FIG. 6e  FIG. 6f

IMMOBILIZER SYSTEM-MOUNTING VEHICLE AND MEMBER USED FOR THE IMMOBILIZER SYSTEM

BACKGROUND OF THE INVENTION

The present invention relates to immobilizer systems for installation in vehicles, immobilizer operation members incorporating immobilizer transmitters for transmitting immobilizer identification codes, and immobilizer operation member receiving devices for receiving the immobilizer operation members.

Automobile engines are started by inserting an ignition key into a key cylinder and turning it.

In recent years, to prevent thefts, ignition keys that control engine starting with electric signals, which are transmitted from the key, in addition to key turning have been used.

Such an ignition key incorporates a transmitter that transmits a special identification code (immobilizer identification code). When the identification code transmitted from the transmitter matches an identification code preset in an engine starting control computer (i.e., ECU) of a receiver installed in the vehicle, the engine is electronically controlled and started. Therefore, the starting of the engine is permitted only by a key incorporating the transmitter. This prevents the automobile from being stolen. Such a system is referred to as an immobilzer system.

The transmitter, which is incorporated in the ignition key, is driven by a battery, which is located in the grip of the key, to transmit an identification code when a switch located on the grip is operated. However, the identification code cannot be transmitted when the battery becomes low on power. In such case, the engine cannot be started even when using an authorized ignition key. Thus, ignition keys incorporating immobilizer transmitters (hereafter referred to as transponders) that do not require batteries have recently become popular.

When magnetism produced by a magnetism generator of the receiver reaches the transponder, the transponder converts the magnetic energy to electric energy to generate electric power. The electric power is used to transmit the radio waves of the identification code. This eliminates the need to replace batteries and enables usage over a long period of time.

Generally, if a duplicate of the ignition key incorporating the immobilizer transmitter is necessary, the duplicate must be bought from the dealer who sold the automobile.

However, in the prior art, the surface of the ignition key only includes markings such as the trademark of the automobile maker. Thus, if the user forgets that the ignition key incorporates an immobilizer transmitter, the user may have a locksmith produce a duplicate that only copies the shape of the ignition key plate.

Although such a duplicate key has a key plate that is identical to that of the ignition key, the duplicate key does not incorporate the immobilizer transmitter. Accordingly, if the duplicate key is inserted into the key cylinder and turned to start the engine, the engine will not start. Furthermore, if a number of people use the same ignition key, some of them may not know about the immobilizer system. In such case, the ignition key may be handled carelessly, in the same manner as a normal ignition key that does not incorporate an immobilizer transmitter.

Additionally, in this system, it may be difficult to determine whether there is a problem with the vehicle or the immobilizer transmitter in the ignition key when the engine does not start. In the prior art, there is no way to recognize that the ignition key is one element of the immobilizer system. Thus, if efforts to locate the cause of the problem are directed only toward the vehicle, troubleshooting of the ignition key will be delayed.

SUMMARY OF THE INVENTION

Accordingly, it is an objective of the present invention to provide a vehicle having an immobilizer system installed, an immobilizer operation member incorporating elements constituting the immobilizer system, and a vehicle immobilizer operation member receiving device for receiving the immobilizer operation member that indicates and notifies the user of the existence of the immobilizer system so that the user will handle the immobilizer operation member with care. It is also an objective of the present invention to provide a vehicle having an immobilizer system, an immobilizer operation member, and an immobilizer operation member receiving device that do not delay troubleshooting of the system.

The gist of the invention is an immobilizer system for installation in a vehicle to prevent unauthorized use of the vehicle. The immobilizer system includes a receiver attached to the vehicle, and a control circuit in the vehicle for storing an identification code. The control circuit is linked with the receiver. The system also includes an operation member, which is independent and separable from the vehicle. The operation member stores a code. The operation member activates the immobilzer system to perform a verification process for verifying whether the operation member is authorized for use with the vehicle when the operation member is placed in a predetermined position with respect to the vehicle. The system further includes a transmitter in the operation member for transmitting a signal to the receiver for communication with the receiver regarding a comparison of the code stored in the operation member with the code stored in the vehicle. Operation of the vehicle is permitted only when the code stored in the activator matches the code stored in the vehicle. The system further includes an indication portion located on the operation member or the vehicle for indicating the existence of the immobilizer system. The indication portion is capable of being noticed by a vehicle operator.

In one embodiment, the indication portion is a first indication portion located on the activator, and a second indication portion, which also indicates the existence of the immobilizer system, is located on a surface of the vehicle that is visible to the operator.

In a further embodiment, the activator is a key that is engagable with a key opening formed in the vehicle, and the first indication portion is a symbol located on the key.

Further, the first and second indication portions may be symbols that are substantially the same.

In another embodiment, the indication portion is a symbol located on the vehicle in close proximity to the opening.

BRIEF DESCRIPTION OF THE DRAWINGS

FIG. 5 is a plan view showing a further embodiment.

FIGS. 6(a) to (f) are plan views showing further embodiments.

DETAILED DESCRIPTION OF THE PREFERRED EMBODIMENTS

Figure 1:
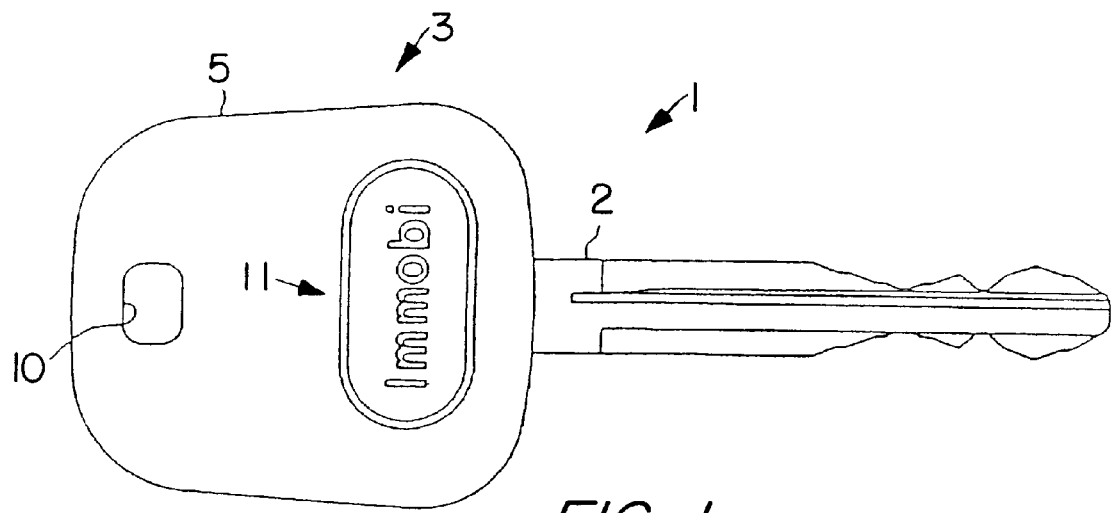
FIG. 1 is a plan view of an ignition key employed in a first embodiment according to the present invention.

An ignition key serving as an immobilizer operation member according to a first embodiment of the present invention will now be described with reference to FIGS. 1 to 3.

Figure 2A:
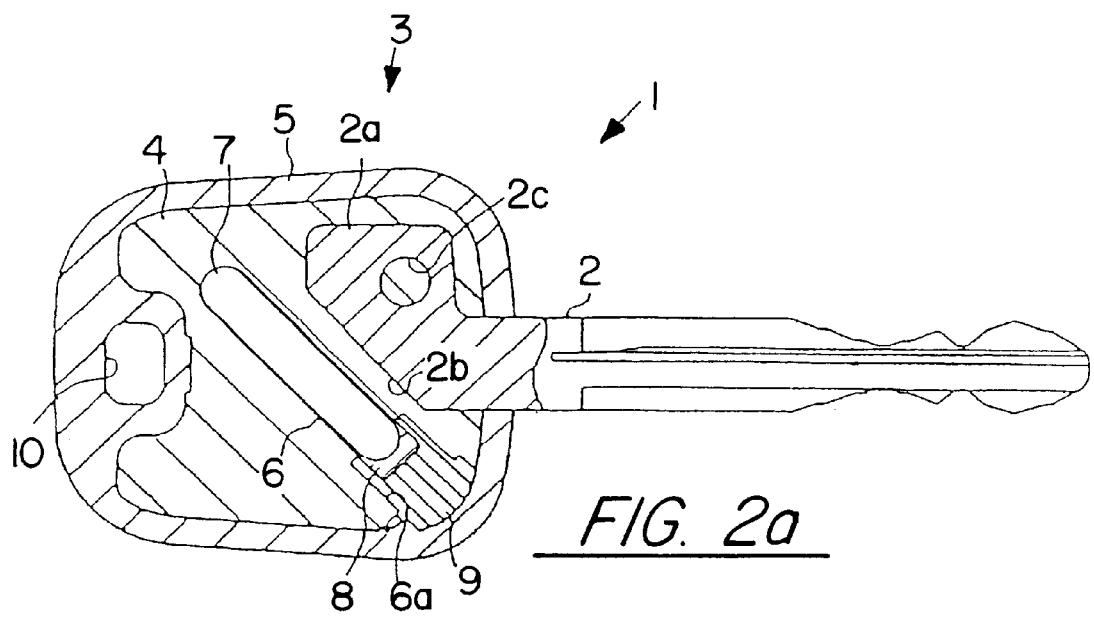
FIG. 2(a) is a cross-sectional plan view of the ignition key.
Figure 2B:
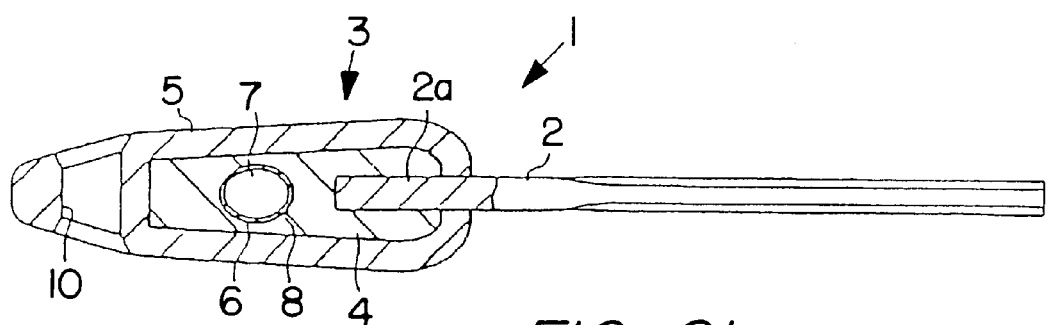
FIG. 2(b) is a cross-sectional side view of the ignition key.

As shown in FIG. 2(a), an ignition key 1 includes a key plate 2. The key plate 2 has a base 2a in which a cutaway portion 2b is inclined at a predetermined angle (45° in the preferred embodiment) relative to the longitudinal direction (horizontal direction as viewed in FIG. 1) of the key plate 2. An engaging hole 2c is formed in the base 2a. The ignition key 1 further includes a grip 3.

As shown in FIGS. 2(a) and (b), the grip 3 includes a holder 4 and a protector 5 covering the holder 4. The holder 4 is made of a highly rigid resin or the like, such as polybutylene terephthalate (PBT), and is insert molded such that the base 2a of the key plate 2 is covered. Insert molding refers to a method of molding in which a component made of metal or other material, which is to be embedded in the molded product, is arranged in a mold before starting the molding. In other words, the key plate 2 is arranged in a mold so that it is embedded in the holder 4, which is the molded material, when molding is completed.

The protector 5 is made of a soft resin or the like, such as polyvinyl chloride (PVC) and is also formed by insert molding such that the holder 4 is covered. As shown in FIG. 1, "Immobi" is impressed on the surface of the protector 5 to define a first indication portion 11. "Immobi" is short for immobilize, which means "render incapable of movement". The impressed first indication portion 11 defines ridges and valleys on the surface of the protector 5.

An accommodating cavity 6, which serves as an accommodating portion, is defined in the holder 4. The accommodating cavity 6 extends parallel to the cutaway portion 2b of the key plate 2 and is inclined 45° with respect to the longitudinal direction of the key plate 2. The accommodating cavity 6 has an opening 6a facing toward the distal end of the ignition key 1 (toward the right as viewed in FIG. 1). A transponder 7, which serves as an immobilizer transmitter, is accommodated in the accommodating cavity 6.

The transponder 7 is a cylindrical glass tube containing an antenna coil, a transformer, a capacitor, an IC, and the like (none of which are shown) and has sealed semi-spherical ends.

The antennal coil is arranged in the transponder 7 generally in the longitudinal direction of the transponder 7.

With the ignition key 1 inserted in the key cylinder, the antenna coil converts the magnetism acting thereon to electric power most efficiently when arranged parallel to the key plate 2. Furthermore, the antenna coil converts the magnetism acting thereon efficiently as long as the antenna coil is inclined about 45° or less with respect to the longitudinal axis of the key plate 2.

If the transponder 7 is arranged such that the antenna coil is parallel to the key plate 2, the long transponder 7 would make it necessary to extend the length of the grip 7. This arrangement would thus limit the length of the transponder 7. However, if the transponder 7 is inclined 45° with respect to the key plate 2, not only can magnetism be efficiently converted to electric power, but the grip 3 can also be shortened.

Furthermore, the transponder 7 must be separated from the metal base 2a by a predetermined distance (about a few millimeters) to transmit radio waves to the receiver without interference from the base 2a. Thus, the accommodating cavity 6 is formed such that the transponder 7 is separated from the cutaway portion 2b by a predetermined distance (about a few millimeters), and the transponder 7 is longitudinally parallel to the cutaway portion 2b of the key plate 2 when in the accommodating cavity 6.

The accommodating cavity 6 is filled with a predetermined amount of an adhesive 8 before the transponder 7 is inserted. Thus, the adhesive 8 fills the space between the transponder 7 and the wall of the accommodating cavity 6. In this embodiment, silicone is employed as the adhesive 8.

A cap 9, which serves as a closing member, is fitted in the opening 6a to close the accommodating cavity 6. The amount of adhesive 8 that fills the accommodating cavity 6 is predetermined such that when the transponder 7 is inserted in the accommodating cavity 6, the adhesive 8 sufficiently fills the space formed between the transponder 7, the accommodating cavity 6, and the cap 9.

The immobilizer system of this embodiment will now be described.

Figure 3:
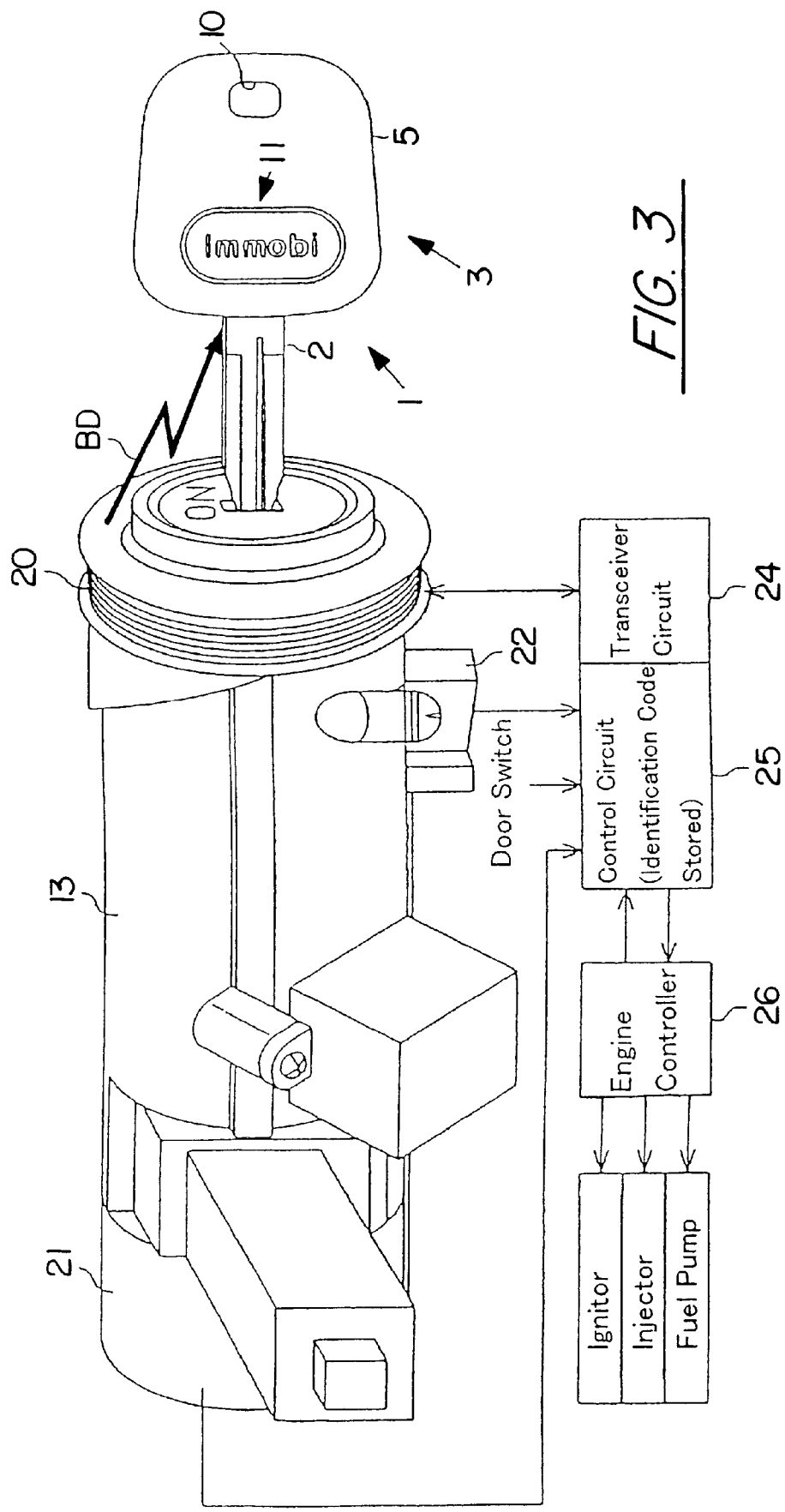
FIG. 3 is a perspective view showing a key cylinder.

The immobilizer system of this embodiment is shown in FIG. 3. The immobilizer system is constituted by the transponder 7 in the holder 4 of the key 1, a transceiver circuit 24 serving as an immobilizer receiver for performing code communication with the transponder 7 by means of an antenna coil 20, which is wound about a key cylinder 23 into which the key 1 is inserted, and a control circuit 25 for controlling the operation of the transceiver circuit 24.

When antenna coil in the grip 3 generates electric current by receiving a magnetic field BD from the antenna coil 20 in the key cylinder, the transponder 7 accumulate the electric current in the capacitor via the transformer. When the accumulated voltage reaches a predetermined value, the transponder 7 transmits a predetermined identification code, which is preset in the transponder's IC. As shown in the drawing, when the driver inserts the key 1 into the key cylinder 23, the control circuit 25 recognizes the insertion of the key 1 through a key unlock warning switch (key existence switch) 22 and starts to read the identification code.

As described above, the transceiver circuit 24 supplies the transponder 7 of the key 1 with electric power, which is generated by electromagnetic coupling. This inputs the identification code, which is read from an control circuit 25 (not shown) of the transponder 7, into the transceiver circuit 24. The transceiver circuit 24 demodulates the input identification code in a predetermined manner and outputs the code to the control circuit 25. The identification code reading process is conducted during the time period starting from when the key 1 is inserted to when the key 1 is turned to the starting position (using about 100 ms (milliseconds) of this time period).

After reading the identification code, the control circuit 25 compares the read identification code with a code registered in the EEPROM and determines whether the codes match.

If the identification codes do not match due to forgery of the key 1 or other reasons, the control circuit 25 sends a command code to an engine controller 26 to prohibit starting of the engine. As a result, the engine controller 26 prohibits the actuation of the ignitor, the injector, or the fuel pump.

On the other hand, if it is determined that the identification codes match, the control circuit 25 sends a command signal to the engine controller 26 to permit starting of the engine (the issuance of starting permission).

The issuance of the starting permission commences the controlling of the ignitor, the injector, and the fuel pump with the engine controller 26 and allows the vehicle to be driven. For the issuance of the starting permission, other conditions must be satisfied. Such conditions generally include the door being closed, the key unlock warning switch 22 recognizing the key, and the ignition switch 21 being arranged at an IG-ON position (FIG. 3).

There are various electronic control methods that can be employed by a computer to stop the starting of an engine. For example, if the identification codes do not match, the of the ignition coil may be cut, the injection of fuel by an EFI (electronic fuel injection controller) may be cut, or the actuation of the starter may be prohibited. The magnetism generator is actuated when the ignition key 1 is inserted into the key cylinder.

The advantages of the above embodiment will now be described.

(A) To start the engine using the ignition key 1, which is described above, the ignition key 1 is inserted into the key cylinder and then turned. When turning the ignition key 1, a force is applied to the grip 3 in the torsional direction. However, the holder 4 of the grip 3 is made of a resin having high rigidity. Thus, the grip 3 is not deformed despite applications of torsional forces. Accordingly, the key plate 2 does not become loose even if the ignition key 1 is turned repetitively and used over a long period of time.

(B) The magnetism generator of the key cylinder generates magnetism when the ignition key 1 is inserted into the key cylinder. The magnetism causes the transponder 7 to generate electric current with the antenna coil in the transponder 7, which results in an accumulation of voltage in the capacitor via the transformer. Transmission of the predetermined identification code stored in the transponder's IC occurs when the voltage accumulated in the capacitor reaches a predetermined value. The antenna coil extends generally in the travelling direction of the ignition key 1 so that the antenna coil magnetizes easily. Thus, electric power for transmitting the identification code is obtained efficiently. Furthermore, the transponder 7 and the metal base 2a are separated from each other by a predetermined distance (a few millimeters) such that the transmitted radio waves are not interfered with by the metal key plate 2. This guarantees the reception of the identification code by the receiver in the key cylinder.

The identification code received by the receiver is compared with the identification code stored in the engine starting control computer (ECU, or the like). When turning the ignition key 1, the engine is started only if the identification codes match. If the identification codes do no match, the computer prohibits the starting of the engine in accordance with its controlling method, such as by cutting the activation of the ignition coil, the injection of fuel with the EFI, or the actuation of the starter. This prevents thefts.

(C) The protector 5 is made of a soft resin such as PVC. Therefore, the grip 3 has a comfortable feel. Furthermore, if the ignition key 1 is dropped accidentally, the impact of the fall is absorbed by the protector 5, which is made of a soft resin, and the adhesive 8, which fills the accommodating cavity 6. This prevents damage to the transponder 7.

(D) In this embodiment, the first indication portion 11 indicating "Immobi" is impressed on the surface of the protector 5, which constitutes the grip 3. This notifies the person holding the ignition key 1 that the key is special and contains electronic components. Thus, the person would likely know that the ignition key 1 must be handled with care.

(E) The first indication portion 11 impressed on the surface of the protector 5 has ridges and valleys. Thus, the first indication portion 11 serves to prevent slippage.

(Second Embodiment)

A second embodiment will now be described with reference to FIGS. 3 and 4.

Figure 4:
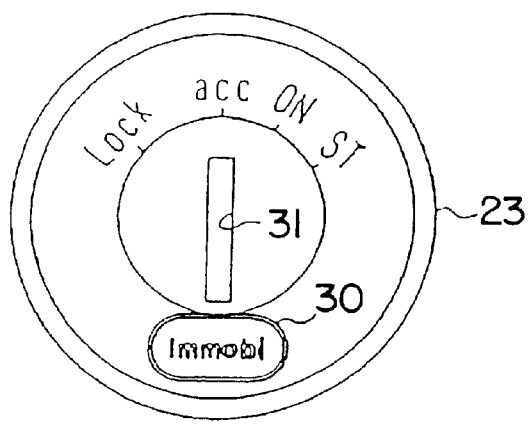
FIG. 4 is a front view of a key cylinder employed in a second embodiment.

FIG. 4 shows a schematic front view of a key cylinder 23, which serves as a receiving device located in front of the driver's seat.

In addition to the structure of the first embodiment, in this embodiment, as shown in the drawing, a second indication portion 30 is impressed on the key receiving surface of the key cylinder 23, into which the ignition key 1, serving as an immobilizer operation member, is inserted. The second indication portion is formed by impressing "Immobi" in the same manner as the first indication portion 11 of the ignition key 1 employed in the first embodiment. The dimensions of the two "Immobil" indication may be identical or similar. In FIG. 4, a key hole 31 is provided in the end surface of the key cylinder 23.

The advantages of the second embodiment will now be described.

(A) In this embodiment, an impression similar to the first indication portion 11 provided on the grip 3 of the ignition key 1 is provided on the key receiving surface of the key cylinder 23. Thus, when the ignition key 1 is inserted into the key cylinder 23, the ignition key 1 and the key cylinder 23, which serves as an immobilizer operation member receiving device, can both be acknowledged as being relevant to the immobilizer system.

(B) In addition, if an ignition key is used that is not part of the immobilizer system, it can be confirmed that an immobilizer system is installed in the vehicle by looking at the second indication portion 30 of the key cylinder 23.

The present invention may also be embodied in the further embodiments described below.

1) The holder 4 and the protector 5 of the above embodiments may be made of other appropriate materials such as polyethylene (PE), polypropylene (PP), acrylonitrilebutadiene-styrene copolymer (ABS), or the like.

2) In addition to transponders, the above embodiments may be applied to an ignition key having a grip that incorporates a keyless transmitter, which constitutes a keyless system and transmits keyless identification codes.

The phrase "keyless system" refers to a system that locks or unlocks vehicle doors with a door locking mechanism when a keyless identification code transmitted by the keyless transmitter and received by a keyless receiver, which is arranged in the vehicle, matches a predetermined keyless identification code.

3) A plasticizer may appropriately be added to the PVC, or the like, of which the protector 5 is made, to apply rubber elasticity to the grip 3. This improves the feel of the grip 3.

4) In the above embodiments, the first indication portion uses letters. However, as shown in FIG. 5, for example, a symbol representing a key and radio waves, may be impressed instead. FIGS. 6(a)–(d) show embodiments using other symbols. In FIG. 6(a), "E" is impressed as a symbol to indicate the inclusion of electronic components in the grip 3. FIG. 6(b) shows a capsule-like symbol, which is similar to the shape of the transponder 7, as the first indication portion 11. In FIG. 6(c), a symbol of a transistor, which represents electronic components, forms the first indication portion 11. In FIG. 6(d), a symbol representing the transmission of radio waves forms the first indication portion 11.

The first indication portion 11 may be formed on the surface of the key plate 2, as shown in FIG. 6(e), instead of on the grip 3, as shown in FIGS. 6(a)–(d). The first indication portion 11 may also be formed on both the key plate 1 and on the grip 3.

A first indication portion 11 representing the actuated state of the immobilizer system may be impressed on the grip 11, as shown in FIG. 6(f).

5) In each of the illustrated embodiments, the first indication portion 11 is impressed on the surface of the grip 3 to indicate the incorporation of the immobilizer transmitter. However, a voice synthesizing circuit may be incorporated in the grip instead. The switch activation by the transmitting key transmits radio waves and activates the voice synthesizing circuit to output "words" stored in the voice synthesizing circuit. Signals representing a message notifying the operator that duplication is prohibited, such as "this key is an immobilizer key, duplication is prohibited" are then output to subsequently generate a voice with a converting device such as a compact speaker. In this case, the first indication portion corresponds to the voice synthesizing circuit that notifies the operator of the employment of the immobilizer system.

6) In the first embodiment, the voice synthesizing circuit may be incorporated in the control circuit 25 of the vehicle. When the key is inserted into the key cylinder 23 and turned to the starting position and the input identification code does not match the stored identification code, the control circuit 25 sends a command code to the engine controller 26 to prohibit starting of the engine. A voice command signal is also sent to the voice circuit to generate "words" stored in the voice synthesizing circuit. Signals representing a message notifying the operator that the engine cannot be started due to the key, such as "this key is not the ignition key for the immobilizer system of this vehicle" are then output to subsequently generate a voice with a converting device such as a compact speaker. In this embodiment, a state in which the identification code is not received from the key is considered to be a state in which the identification codes do not match.

In this case, the voice synthesizing circuit and the speaker provided in the control circuit 25 of the vehicle serve as a notification means. The control circuit 25 serves as a notification control means that outputs command signals to the voice synthetic circuit when identification codes are not sent from the key or when the input identification code does not match the stored identification code.

7) In the above embodiments, the transponder 7 is a cylindrical glass tube that contains electronic components. However, a wedge type transponder or a substrate type transponder may be used instead.

8) In the above embodiments, the transponder 7 is arranged at an angle of 45° relative to the longitudinal axis of the key plate 2. However, the arrangement is not limited to this angle and may be changed arbitrarily to other angles.

Figure 7:
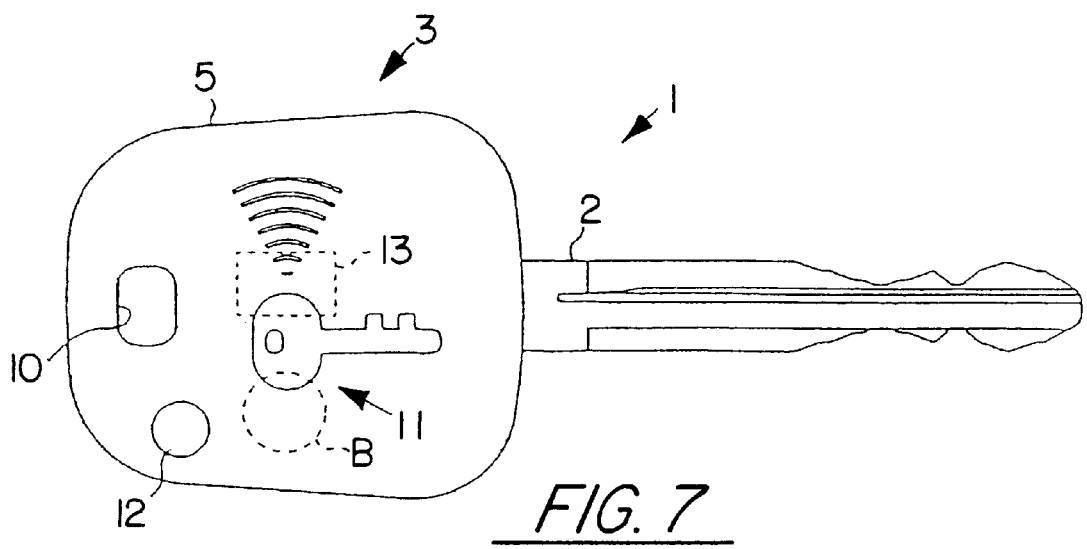
FIG. 7 is a plan view showing a further embodiment.

9) The above embodiments are applied to an ignition key incorporating a transponder, which does not require a battery and which serves as an immobilizer transmitter. However, a battery B and a transmitter 13, which serves as an immobilizer transmitter in lieu of the transponder 7 and which transmit a predetermined identification code, may be incorporated in the grip 3. The battery B supplies the transmitter 13 with electric power. In this case, as shown in FIG. 7, the battery B and the transmitter 13 are electrically connected to each other by way of a button switch 12, which is arranged on the grip 3. The button switch 12 is pressed to activate the transmitter 13 and transmit the identification code.

Regarding the embodiment of FIG. 1, a button switch may be arranged between the capacitor and the IC. In this case, the button switch is pressed to activate the transmitter when charging of the capacitor is completed.

10) In the above embodiments, a transponder 7, which serves as an immobilizer transmitter, is incorporated in the grip 3 of the ignition key 1. However, an immobilizer transceiver may be incorporated in lieu of the transponder 7. In this case, the immobilizer system is provided with an identification code transceiver, which is arranged in the key cylinder and which transmits an identification code. When an ignition key is inserted into the key cylinder, the identification code transceiver is activated to transmit the identification code. The immobilizer transceiver of the ignition key then receives the identification code and transmits a permission signal if the received identification code matches the predetermined identification code. When the key cylinder transceiver receives the permission signal, the engine control computer permits the starting of the engine. If the permission signal is not received, starting of the engine is prohibited.

In this case, the immobilizer transceiver arranged in the ignition key serves as the immobilizer receiver.

Figure 8:
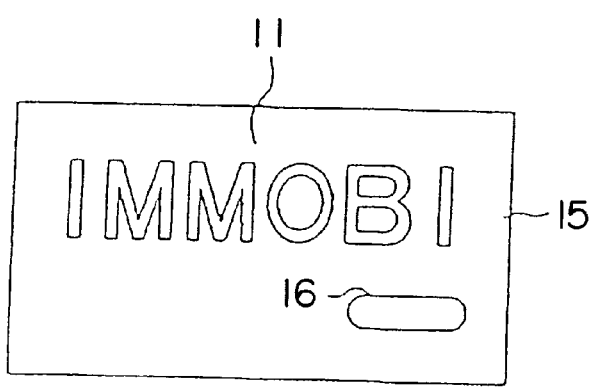
FIG. 8 is a plan view showing a further embodiment.

11) The above embodiments are applied to ignition keys. However, in addition to ignition keys, the above embodiments may also be modified out by arranging an immobilizer transmitter, such as a transponder, on a card 15, or by arranging a receiver in a card having a first indication portion 11. The letters "IMMOBI" are impressed or printed to serve as the first indication portion 11. In FIG. 8, the diameter of the transponder 7 is greater than the thickness of the card. Thus, a lobe 16 is formed on the surface of the card.

12) In the second embodiment, the immobilizer operation member includes the first indication portion 11. However, the second embodiment can be constructed such that only the key cylinder 23 has a second indication portion.

13) In the second embodiment, the immobilizer operation member receiving device of the vehicle is provided in the key cylinder 23. However, the immobilizer operation member receiving device may be defined on members located near the key cylinder. It is significant that the immobilizer operation member receiving device be arranged at a location that allows the driver to acknowledge that an immobilizer system is installed in the vehicle.

14) In the second embodiment, the second indication portion is provided on the key cylinder 23. However, a third indication portion, which is a symbol or word indicating the installation of the immobilizer system, may be provided on the instrument panel, the door, the door handle, or other parts of the vehicle, as long as the third indication portion can be acknowledged by the driver.

The following further summarizes the immobilizer and parts thereof.

In one embodiment (not illustrated) the embedded electronic component key has a grip including a voice synthesizing circuit, which serves as a first indication portion, for generating a message output notifying that "duplication is prohibited", a converting device for converting the output to a voice, and a switch for activating the voice synthesizing circuit.

In this structure, a voice notifying that "duplication is prohibited" is generated by the key. In this case, the speaker in the above paragraph 5) corresponds to the converting device.

As described above in detail, the immobilizer operation member informs the user that the immobilizer operation member incorporates an immobilizer system element so that the user will handle the immobilizer operation member with care. Furthermore, troubleshooting of the system can be carried out without delay.

The arrangement of the indication portion on the grip, where attention is most paid, results in attention to the handling of the operation member.

The third indication portion indicating the employment of the immobilizer system leads to recognition of the installation of the immobilizer system in the vehicle.

When both first and second indication portions are used, the immobilizer operation member and the immobilizer operation member receiving device are recognized as both being relevant to the immobilizer system.

In the embodiment where the activator has a transceiver that sends a command when the codes do not match notification control means outputs a command to the notification means when the immobilizer identification codes do not match each other. The notification means then indicates that the immobilizer codes do not match based on the command. Thus, if the engine cannot be started, troubleshooting of the system is not delayed.

What is claimed is:

1. An immobilizer system for installation in a vehicle to prevent unauthorized use of the vehicle, the immobilizer system comprising:

a receiver attached to the vehicle;

a circuit in the vehicle for storing a first code, the circuit being linked with the receiver;

an operation member, which is independent and separable from the vehicle, wherein the operation member stores a second code, and wherein the operation member activates the circuit to perform a verification process for verifying when the operation member is placed in a predetermined position with respect to the vehicle;

a transmitter accommodated in said operation member for transmitting a signal to the receiver for communication with the receiver regarding a comparison of the second code stored in the operation member with the first code stored in the circuit, wherein operation of the vehicle is permitted only when the first and second codes match; and an indication portion located on the surface of one of said operation member and the vehicle for indicating the existence of the immobilizer system, wherein the indication portion is capable of being noticed by a vehicle operator.

2. The system of claim 1, wherein the indication portion comprises a first indication portion located on the operation member, and a second indication portion located on a surface of the vehicle that is visible to the operator.

3. The system of claim 2, wherein the operation member is a key that is engagable with a key opening formed in the vehicle, and the first indication portion is a symbol located on the key.

4. The system of claim 3, wherein the first and second indication portions are symbols that are substantially the same.

5. The system of claim 1, wherein the operation member is a key that is engagable with a key opening formed in the vehicle, and the indication portion comprises a first symbol located on the vehicle in close proximity to the key opening.

6. The system of claim 5, wherein the indication portion further comprises a second symbol located on the key.

7. The system of claim 6, wherein the first and second indication symbols are substantially the same.

8. The system of claim 1, wherein the operation member is a key that is engagable with a key opening formed in the vehicle, and the indication portion is a symbol located on a grip of the key.

9. An immobilizer system for installation in a vehicle to prevent unauthorized use of the vehicle, the immobilizer system comprising:

a receiver attached to the vehicle;

a circuit connected to the receiver and including a storage device in the vehicle for storing a first code, the circuit being linked with the receiver;

an operation member to be handled by a vehicle operator, wherein the operation member is independent and separable from the vehicle, wherein the operation member stores a second code, and wherein the operation member activates the circuit;

a transmitter accommodated in said operation member for transmitting a signal to the receiver, wherein operation of the vehicle is permitted only when the transmitted signal indicates that the first code stored in the storage device matches the second code stored in the operation member; and a symbol located on the surface of one of said operation member and the vehicle for indicating the existence of the immobilizer system, wherein the symbol is in a position such that the symbol is likely to be noticed by a vehicle operator when the vehicle operator uses the operation member.

10. The system of claim 9, wherein the symbol comprises a first symbol located on the operation member, and a second symbol located on a surface of the vehicle that is visible to the operator.

11. The system of claim 10, wherein the operation member is a key that is engagable with a key opening formed in the vehicle.

12. The system of claim 11, wherein the first and second symbols are substantially the same.

13. The system of claim 9, wherein the operation member is a key that is engagable with an opening formed in the vehicle, and the symbol comprises a first symbol located on the vehicle in close proximity to the opening.

14. The system of claim 13, wherein the symbol further comprises a second symbol located on the key.

15. The system of claim 14, wherein the first and second symbols are substantially the same.

16. An immobilizer system for installation in a vehicle to prevent unauthorized use of the vehicle, the immobilizer system comprising:

a receiver attached to the vehicle;

a circuit in the vehicle for storing a first code, the circuit being connected with the receiver for communicating with the receiver;

an operation member to be handled by a vehicle operator and to be engaged with the vehicle prior to operation of the vehicle, wherein the operation member is independent and separable from the vehicle, wherein the operation member stores a second code, and wherein the operation member activates the circuit to perform a verification process for verifying whether the operation member is authorized for use with the vehicle when the operation member is engaged with the vehicle;

a transmitter and an antenna, both embedded in the operation member, for transmitting a signal to the receiver for communication with the receiver regarding a comparison of the second code stored in the operation member with the first code stored in the circuit, wherein operation of the vehicle is permitted only when the first and second codes match; and a readily noticeable symbol formed on the surface of one of said operation member and the vehicle for indicating the existence of the immobilizer system to a person.

17. The system according to claim 16, wherein the operation member is a key, and the symbol is formed on a grip of the key.

18. The system according to claim 17, wherein a second symbol that is substantially identical to the symbol formed on the key is formed on the vehicle in a location that is readily noticeable.

19. The system according to claim 16, wherein the operation member is a key, and the vehicle includes a key opening for receiving the key, and wherein the symbol is formed on the vehicle in close proximity to the key opening.

* * * * *